Nov. 4, 1924.
H. R. KENT
1,513,827
MOTOR SPRING HANDLING APPARATUS
Filed Sept. 28, 1922    3 Sheets-Sheet 1
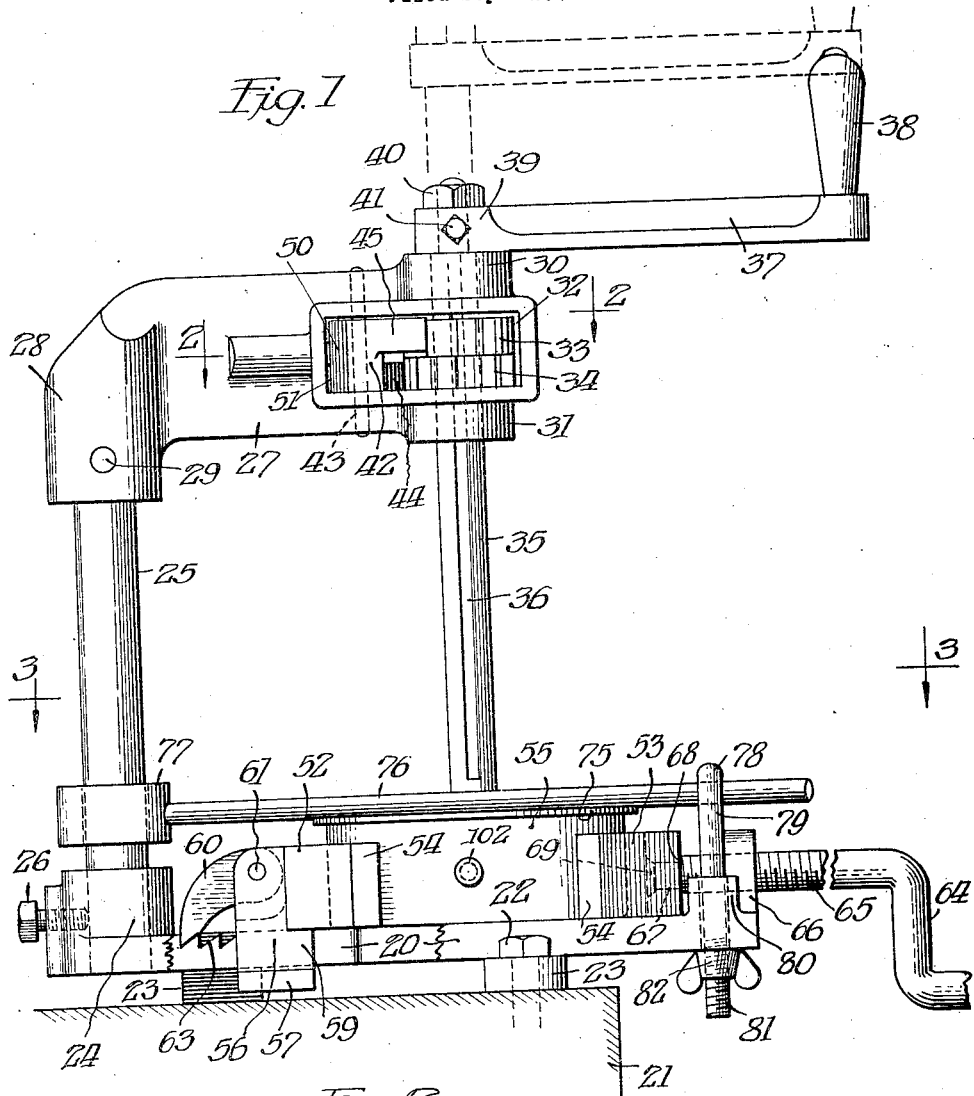
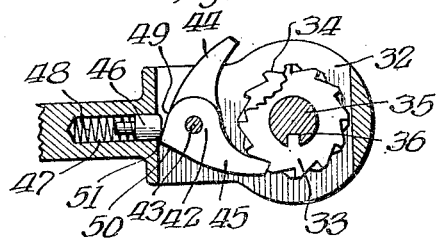
Inventor:
Herbert R. Kent,
By Fisher Towle Clapp + Soans
attys.

Nov. 4, 1924.
H. R. KENT
1,513,827
MOTOR SPRING HANDLING APPARATUS
Filed Sept. 28, 1922    3 Sheets-Sheet 2
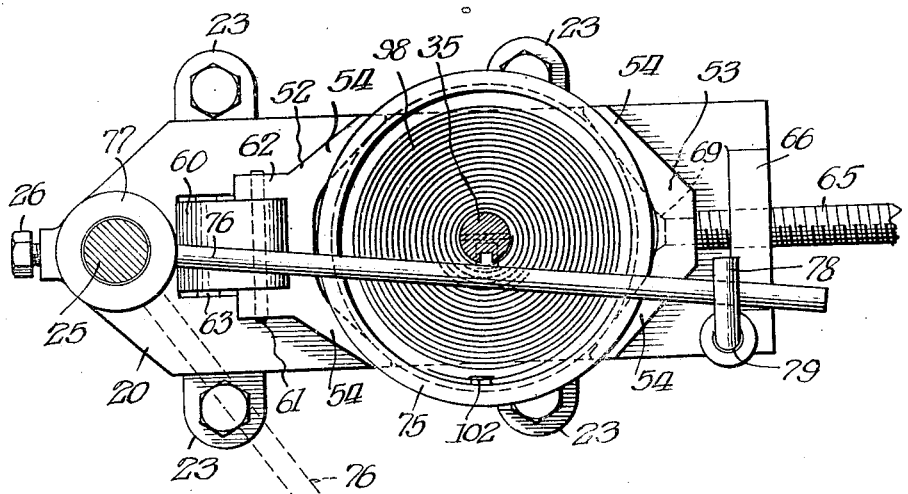
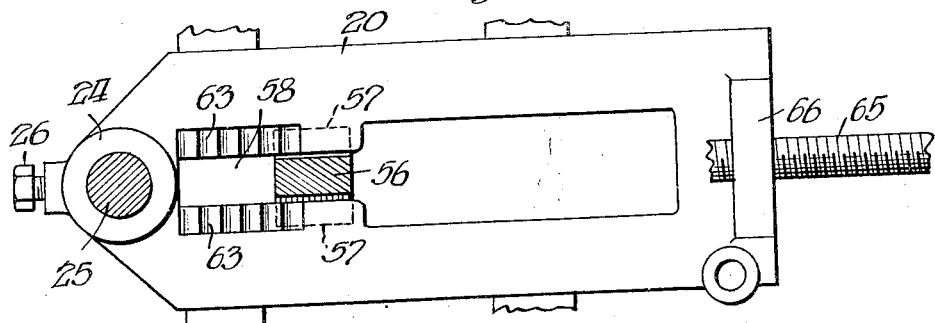
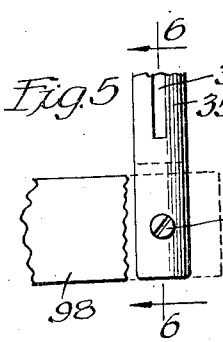 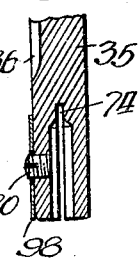 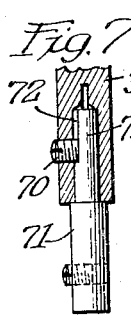 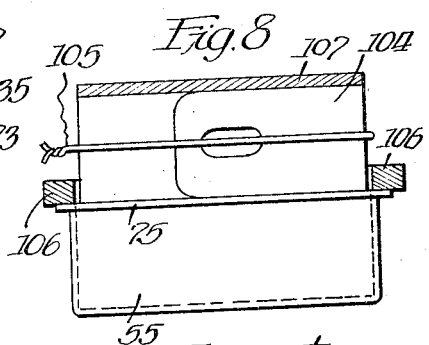
Inventor:
Herbert R. Kent,
By Fisher Towle Clapp & Soans
attys.

Nov. 4, 1924.
H. R. KENT
MOTOR SPRING HANDLING APPARATUS
Filed Sept. 28, 1922    3 Sheets-Sheet 3
1,513,827
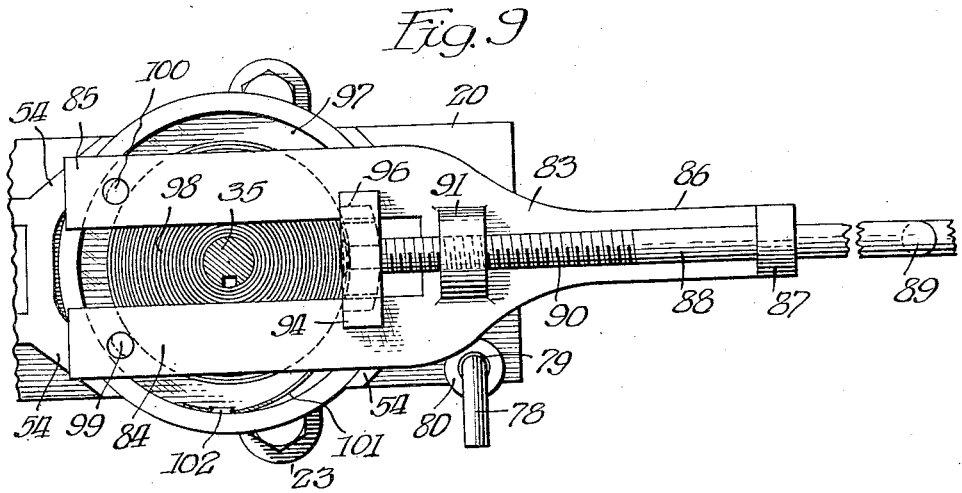
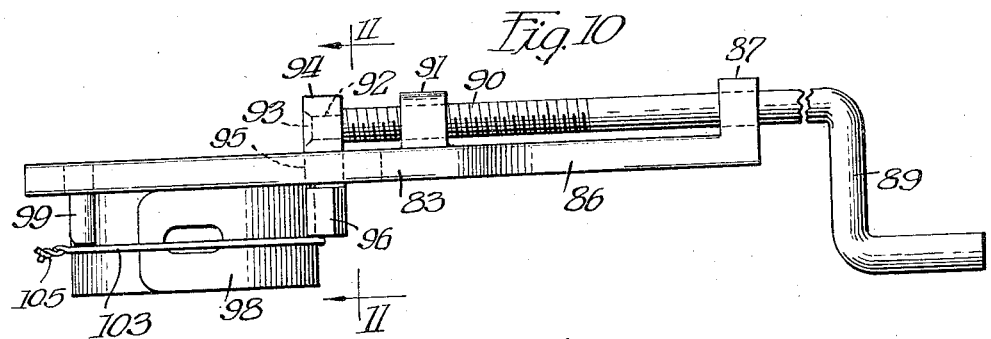
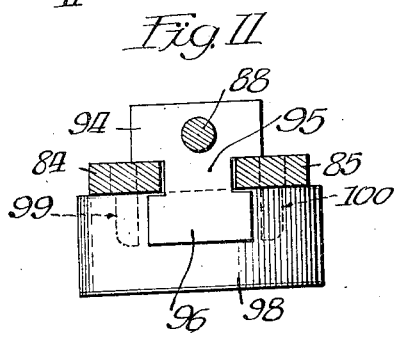
Inventor:
Herbert R. Kent,
By Fisher Towle Clapp & Soans
attys.

Patented Nov. 4, 1924.

1,513,827

UNITED STATES PATENT OFFICE.

HERBERT R. KENT, OF CHICAGO HEIGHTS, ILLINOIS, ASSIGNOR TO KENT SALES AGENCY, OF CHICAGO HEIGHTS, ILLINOIS, A COPARTNERSHIP COMPRISING HERBERT R. KENT, FRANK L. COLE, CHARLES H. THOMAS, AND JOHN E. THOMAS.

MOTOR-SPRING-HANDLING APPARATUS.

Application filed September 28, 1922. Serial No. 591,048.

*To all whom it may concern:*

Be it known that I, HERBERT R. KENT, a citizen of the United States, residing at Chicago Heights, in the county of Cook and State of Illinois, have invented certain new and useful Improvements in Motor-Spring-Handling Apparatus, of which the following is a specification.

My invention relates to improvements in motor spring handling apparatus, and is of particular value in handling springs of the "clock" type, such as are used to furnish the motive power for sound reproducing machines.

Springs of the character referred to are usually contained in cylindrical enclosing drums or barrels which are secured rigidly to the machine for which the spring furnishes the motive power. The flat spring steel of which the spring is constructed, is positioned within the drum or barrel in a spiral coil, the outer end of which is usually perforated to engage a pin fixed in the wall of the drum, while the inner end of the coil is also perforated to engage a hook or similar projection on the shaft or arbor of the machine, through which shaft the motive power is applied to the mechanism, and by which shaft the spring is wound up.

As there is a demand among talking machine users for a motor which will continue to operate as long a time as possible with one winding, such motor springs are made extremely powerful and of large size, so as to deliver a maximum amount of power. However, such size and power of the springs introduce considerable difficulties when it is necessary to replace broken springs or to remove springs for purposes of repair or lubrication. Many accidents have occurred in handling such springs, both in removing same from and introducing same into the drums or cases, as even though the spring may be completely unwound, the energy remaining in the spring is of considerable volume and when the spring is removed from the case the spring has a tendency to expand with explosive violence.

The object of my invention is to provide means for handling such motor springs in such manner that the element of danger is practically eliminated; to provide convenient means for quickly extracting such a motor spring from its enclosing drum; to provide means whereby lubrication of the spring is greatly facilitated; to provide means for safely and expeditiously removing a broken spring from its case and introducing a new spring therein; to provide apparatus of the character specified which shall be capable of accommodating springs of widely different sizes; and in general, to provide an improved and efficient motor handling apparatus of the character referred to.

In the drawings which illustrate a preferred embodiment of my invention—

Fig. 1 is an elevation of my improved apparatus;

Fig. 2 is a section on the line 2—2 of Fig. 1;

Fig. 3 is a section taken on the line 3—3 of Fig. 1;

Fig. 4 a fragmentary view similar to Fig. 3, certain parts being broken in order to better illustrate the construction;

Fig. 5 is a fragmentary elevation of the lower end of the winding arbor;

Fig. 6 is a section taken on the line 6—6 of Fig. 5;

Fig. 7 is a view similar to Fig. 6, showing the use of an insert for a smaller spring;

Fig. 8 shows the method of inserting a new spring into the case or drum;

Fig. 9 is a plan view of the tongs for grasping and handling a wound-up spring;

Fig. 10 is a side elevation of the tongs shown in Fig. 9; and

Fig. 11 is a section taken on the line 11—11 of Fig. 10.

Referring to the drawings, 20 is a cast iron base plate which is adapted to be secured to the work bench 21 by means of bolts as at 22, extending through integral feet or lugs 23. At the rear of the bed plate 20 there is an integral upstanding cylindrical boss 24 bored out vertically to receive the lower end of a stout cylindrical column 25 secured in the boss 24 by means of a suitable set screw 26. Upon the upper end of the column 25 there is mounted a bracket arm 27, said arm having at its inner end a boss bored out to receive the upper end of the standard which is secured therein by a suitable set screw 29.

At the outer end of the arm or bracket 27 there are formed a pair of vertically aligned bosses 30 and 31 which are separated by a slot or opening 32 which constitutes the interior of a housing for the ratchet gears 33 and 34. Said gears 33 and 34 respectively have their teeth pointing in opposite directions. A vertical arbor or winding shaft 35 extends through bearing apertures drilled in bosses 30 and 31 and also through bores formed in the ratchet gears 33 and 34, said shaft 35 also being fitted with a keyway 36 extending substantially from one end of the shaft to the other and co-operating with a key common to the tooth ratchet gears 33 and 34 so that the shaft 35 may be moved vertically as shown in dotted lines in Fig. 1 while maintaining its driving connection with ratchet gears 33 and 34 at all times.

The shaft 35 is rotated by means of a crank 37 and handle 38 therefor, the hub 39 of said crank being secured directly to the upper end of the shaft 35 by means of a nut 40 and key or set screw 41.

In order to prevent the crank 37 from flying around under the influence of the spring when it is desired to remove the hand from the crank during or at the end of, the winding process, I provide a pawl 42. Said pawl is mounted to rock on an axially vertical pin 43 extending through the arm 27 and slot 32 and is equipped with a pair of dogs 44 and 45 which co-operate respectively with the ratchet wheels 34 and 33. The dog 44 or the dog 45, as the case may be, depending upon the direction of rotation which is desired, is forced into operative engagement with its corresponding ratchet wheel by means of a small headed plunger 46 located at the outer end of a horizontally extending cylindrical aperture or bore 47 in the arm 27. Said plunger 46 is forced outwardly of said bore 47 by means of a coiled compression spring 48.

By referring to Fig. 2, it will be observed that the rear of the hub of the pawl 42 is formed with a pair of relatively angularly disposed slightly flatted surfaces 49 and 50 meeting in a vertically extending edge 51 symmetrically disposed with reference to dogs 44 and 45. When the pawl 42 is in operation the plunger 46 engages and co-operates with the flattened portion 49 of the pawl 42 to force the dog 45 into engagement with the ratchet gear 33, thereby resisting right-hand movement of the crank and permitting left-hand movement of the same. When the plunger 46 is in engagement with the flattened surface 50 of the pawl 42 the dog 44 is pressed into engagement with the teeth of the ratchet wheel 34, thus permitting right-hand movement of the shaft and crank while resisting left-hand movement of the same.

In order to more readily and securely clamp, without injury, the case or drum in which the spring is contained, I employ a specially constructed vise or clamp arrangement, which may be adjusted to suit drums or barrels of different sizes. Said vise comprises a relatively stationary jaw 52 and a movable jaw 53. As shown best in Fig. 3, the jaws 52 and 53 are made V-shape, the arms 54 of each jaw being, as to their interengaging surfaces formed substantially at right angles, so that the drum is clamped at four points instead of two points only.

The jaw 52 is adjustable on the bed plate 20 so as to enable the center of the spring case or drum 55 to be located substantially coincident with the axis of the winding arbor 35. Such adjustment is secured by forming the jaw casting 52 with a T-shaped depending lug part 56, the wings 57 of the T-head sliding on the under surfaces of the walls of the slot 58 through which the neck 59 of the T-head 56 extends and along which it slides. The jaw 52 is located in any desired position against movement towards the boss 24 by means of a dog 60, the upper end of which is pivoted on a pin 61 connecting the spaced lugs 62 on the jaw 52, while the lower end or point of said dog 60 is adapted to engage in one of a series of ratchet-like notches 63 formed on the upper surface of the base plate 20 alongside of the slot 58.

The movable jaw 53 is forced towards the relatively stationary jaw 52 of the clamp or vise by means of a crank 64 on the outer end of a screw 65 threaded into a lug 66 integrally formed on the upper surface of the base plate 20. The inner end of the screw 65 is reduced in diameter as shown at 67 to rotate in a bearing aperture in the movable jaws 3, the shoulder 68 thus formed by such reduction in diameter engaging the outer surface of the movable jaw 53. The jaw 53 is prevented from separating from the end of the screw 65 by heading over the inner end of the latter slightly upon the inside of the jaw 53 as shown at 69. Since the lower surface of the movable jaw 53 of the clamp is but slightly separated or may even slide upon the upper surface of the base plate 20 and measures a substantial distance across the points of the arms 54 of said jaw 53, the block or jaw 53 cannot rotate but has a sliding movement only.

In order to effect a driving engagement between the lower end of the winding arbor 35 and the inner end of the spring which is being operated upon, the lower end of said arbor is fitted with a small adjustable stud or preferably a headless set screw 70 of suitable diameter freely to enter the aperture which is always present in the inner end of the spring and by means of which the latter is drivingly connected to the shaft of the machine for which it furnishes a motive power. In the case of relatively large springs the winding up is effected directly upon the arbor itself, but where the spring worked upon is relatively small in size and has a small eye, I prefer to employ a sub-arbor or insert 71 of less diameter than the main arbor or shaft 35 and secured in the latter by means of the set screw 70 engaging a flat 72 on the shank 73 which is inserted in a hollow bore in the lower end of the main arbor 35. Where by reason of the breakage the eye of the spring is missing, the broken end of the same may be inserted into a diametric slot or kerf 74 cut in the lower end of the arbor 35. It will be understood, however, that under ordinary circumstances when the eye of the spring is intact and where the spring is to be preserved for further use, the eye should be wound upon an arbor substantially corresponding in size with the arbor of the machine for which the spring is intended, thereby preventing deformation or injury of the spring.

While the spring is being wound up by the crank 37, it is desirable to prevent intermediate coils of the spring from bellying out or rising above the surface of the flange 75 of the case, otherwise there may be danger of the spring erupting and causing an accident. Such danger is eliminated by providing a safety rod 76 which extends radially from the center of the column 25 and is capable of being swung around the axis of the column 25 by reason of the inner end of said arm being secured in a boss 77 rotatable on said column 25. The outer end of said safety bar 76 is held in the safety position as shown in Figs. 1 and 3 by means of a hook 78 on the upper end of a small vertically extending rod 79 slidable and rotatable in a small upstanding boss 80 on bed plate 20. If desired, the lower end 81 of the said locking member 79 may be threaded to accommodate a thumb nut 82 for clamping the hook 78 securely in place.

Figs. 9, 10 and 11 illustrate the tongs or device for removing the wound up spring from the barrel 55 or for enabling a spring to be safely and conveniently expanded. In said drawings, 83 represents the body portion of the device which is made in the form of a plate having a bifurcation therein forming spaced arms 84 and 85 and an extension arm 86 at the other end thereof which is formed at its upper end with a bearing lug 87 for the screw 88. The outer end of the screw 88 is made with a crank 89, while the inner end is threaded as at 90 to fit the corresponding aperture in an integral lug 91 on the plate 83. On the inner end of said screw 90 there is a reduced neck portion 92 and a head 93 on said neck forming a swivel connection with the sliding block 94. Said block 94 is made with a reduced neck portion as at 95 slidingly fitting within the slot formed by the space between arms 84 and 85, while the lower end 96 of said slide block 94 is curved as shown best in Fig. 9, to fit in the annular space 97 between the wound up spring 98 and wall of casing 55. The ends of arms 85 and 84 are also fitted with downwardly extending pins or fingers 99 and 100 which in conjunction with the thumb element 96 form in effect a hand, by means of which the wound up spring may be grasped and removed from its barrel.

In view of the above description, the operation of the apparatus can be readily explained. When a motor spring of the type described requires attention and with its case is removed from the machine which it drives, the case or barrel containing the spring is placed on the bed plate 20 under the center of arbor 35 which, as before described, may be drawn up into the dotted line position, in order to permit removal or insertion of a spring barrel or spring. The lug 60 is adjusted so that when the crank 64 is operated to clamp the barrel 55 between jaws 52 and 53, the center of the case coincides with the case of the winding arbor. If the spring merely requires to be lubricated, the arbor 35 with or without a sub-arbor 71, according to the size of the spring being operated upon, is lowered into the eye of the spring and the aperture in the inner end of the spring is engaged with the set screw in the end of the arbor. The ratchet pawl 42 is then adjusted in the proper position to prevent unwinding of the spring, it being understood that some motor springs operate in a left-hand direction while others operate right-hand. The safety bar 76 is then adjusted into place, and the crank 38 is turned so as to partially wind up the spring to separate the coils thereof sufficiently for insertion of the necessary lubricant. It may be stated that it is impossible satisfactorily to lubricate a spring of the "clock" type when the spring is completely relaxed or when it is completely wound up, for the reason that the coils are in such intimate engagement with each other that the lubricant cannot enter between the coils. It may be stated that spring lubricants are ordinarily in the form of grease or graphite which does not flow readily, a more fluid lubricant being deemed unsatisfactory for various reasons.

If it is desired to remove the spring from the barrel entirely, either for the purpose of cleaning out the case or barrel or cleaning the spring itself, the spring is completely wound up by the crank 37, after which the tongs as illustrated in Figs. 9, 10 and 11, are moved into position as shown in Fig. 9, with the members 99 and 100 and 96 inserted in the annular space between the spring 98 and the wall of the barrel. As it is only during the time of winding that there is any tendency for the spring to belly out and erupt from its casing, the safety bar 76 may safely be thrown back into operative position as shown in dotted line in Fig. 3, after the spring has been wound up, hence making room for the insertion of the grasping device.

After the tongs or grasping device has been inserted in the position shown in Fig. 9, the fully wound up spring 98 may be securely seized and clamped to said device by means of the crank 89. After this has been done, the mandrel or arbor may readily be removed by permitting the crank 37 to move in a reverse direction for a short distance, thereby disengaging the set screw 70 and permitting the arbor 35 to be lifted vertically out of the way. Then the outer end 101 of the spring which is secured to the wall of the barrel 85 by means of a pin 102 which extends into an aperture of the outer end of the spring, may readily be disengaged, permitting the spring to be lifted by the tongs and removed from its casing.

In the event that it becomes necessary to replace the broken spring with a new spring, the inner portion of the spring is removed in the manner as above described, if a complete spring, or if short, is merely removed by hand, after which the broken inner end of the remainder is inserted in the kerf of the arbor and the spring wound up completely. The grasping device is then used for removing the spring from the casing or barrel and a stout wire as indicated at 103, is tied around the broken or defective spring. If the wire 103 is loose or too large for the spring in its fully wound up condition, the crank 89 may safely be turned so as to extend the jaws or fingers of the grasping device, the spring gradually and safely expanding until further expansion is arrested by the hand or wire 103. The spring may then be removed from the grasping device and disposed of in any desired manner.

Ordinarily it is not necessary to use the grasping device for inserting a new spring, such springs being usually wound up to a diameter slightly less than that of the barrel in which they are encased. As shown in Fig. 8, the new spring 104 which comes from the factory with an enclosing clamp or wire 105, is placed over the open end of the barrel 55 which preferably at that time may be secured in the vise of the winding apparatus. In the case of a very large and powerful spring, it is advisable to place over the mouth of the barrel 55 an auxiliary ring 106, the opening of which is of the same or slightly less diameter than the interior of the barrel 55, such ring 106 acting as a guide while the spring 104 moves into its barrel. Also a top plate or disk of iron or steel 107 may be placed over the top of the spring, by means of which plate the spring may be forced into the barrel 55 and through the safety ring 106. It will be understood that as the spring is moved down into the barrel 55 the retaining band or wire 105 is gradually worked upwardly on the spring until by the time the top of the spring descends to the top of ring 106, the retaining wire 105 may safely be removed from the spring.

When the original or a new spring is inserted in its barrel, the difficulty and danger incident to the hooking of the outside end of the spring over its pin in the wall of the barrel according to old hand method of operation is completely eliminated, by reason of the fact that it is a simple matter to lower the mandrel into position and wind up the spring, whereupon the outer end of the latter may be quickly and conveniently hooked to the barrel. Other advantages of the apparatus will readily occur to those skilled in the art.

The details of construction and operation being illustrative merely of one phase of my invention, it will be understood that the scope of same should be determined by reference to the appended claims, said claims being construed as broadly as possible consistent with the state of the art.

I claim:

1. In a device for handling motor springs, the combination of a clamp for detachably holding a spring barrel, an arbor adjustably mounted on a support adjacent the clamp so as to be insertable in and removable from a barrel when the latter is held by the clamp, and means for rotating said arbor relative to said clamp.

2. In a device for handling motor springs, the combination of a clamp for holding a spring barrel, an arbor adjustably mounted on a support adjacent the clamp for movement to and from a position within the barrel and adapted to connect with the inner end of a spring in the barrel, means for rotating said arbor relative to said clamp, and ratchet means for preventing unwinding movement of said arbor due to the spring.

3. In a device for handling motor springs of the "clock" type, the combination of a base, means for clamping the barrel of the spring to said base, a bracket adapted to extend over the barrel of the spring, a winding arbor mounted in said bracket, ratchet mechanism respectively provided on said arbor and bracket for preventing retrograde movement of said arbor, and means for rotating said arbor.

4. In a device for handling motor springs of the "clock" type, the combination of a base, means for clamping the barrel of the spring to said base, a bracket adapted to extend over the barrel of the spring spaced from but secured to said base, and an arbor rotatable in said bracket and provided at its end with means for operatively engaging the inner end of the spring.

5. In combination, a base plate, a vise on said base plate for grasping a barrel of a "clock" spring, a column extending upwardly from said base and spaced from the side of said barrel, a bracket on the upper end of said column, an arbor vertically slidable in said bracket to permit its lower end to be inserted in the eye of a spring contained in said barrel, and means for rotating said arbor.

6. In combination, a base plate, a vise on said base plate for grasping the barrel of a "clock" spring, a column extending upwardly from said base and spaced from the side of said barrel, a bracket on the upper end of said column, an arbor vertically slidable in said bracket to permit its lower end to be inserted in the eye of a spring contained in said barrel, means on the end of said arbor for operatively engaging the inner end of the spring, and means for preventing retrograde movement of the arbor.

7. In combination, a base plate, a vise on said base plate for grasping the barrel of a "clock" spring, a column extending upwardly from said base and spaced from the side of said barrel, a bracket on the upper end of said column, an arbor vertically slidable in said bracket to permit its lower end to be inserted in the eye of a spring contained in said barrel, means on the end of said arbor for operatively engaging the inner end of the spring, and means for preventing retrograde movement of the arbor, said vise being relatively adjustable on said base to locate barrels of different sizes substantially concentric with the arbor.

8. In apparatus for handling motor springs of the "clock" type, the combination of a clamp for holding the barrel of the spring, an arbor insertable in the barrel for winding up the spring, and a member provided with relatively adjustable parts for grasping the spring after it has been wound up, said member being adapted to straddle the arbor when engaged with the spring in the barrel.

9. In apparatus for handling motor springs of the "clock" type, the combination of clamping means for holding the barrel in which the spring is housed, an arbor insertable in the barrel for winding up the spring while the barrel is clamped in said vise, means for preventing retrograde movement of said arbor after the spring has been wound up, and a grasping device provided with relatively adjustable parts adapted for insertion in the annular space between the wall of the barrel and the exterior of the wound up spring to seize the latter at opposite sides thereof, said device being formed to straddle the arbor in the spring holding position.

10. In apparatus for handling motor springs of the "clock" type, the combination of a vise for holding the barrel in which the spring is housed, an arbor insertable in the barrel for winding up the spring, means for preventing retrograde movement of said arbor due to the unwinding effect of the spring, tongs comprising a member formed to straddle the arbor and provided with a plurality of fingers insertable into the space between the wall of the barrel and exterior of the wound up spring, and screw means for adjusting said parts to grasp opposite sides of the spring.

HERBERT R. KENT.